(12) United States Patent
Ehrlich (10) Patent No.: US 7,623,312 B2
(45) Date of Patent: Nov. 24, 2009

(54) HARD DISK DRIVE OFF TRACK EVENT METHOD AND DEVICE

(75) Inventor: Richard M. Ehrlich, Saratoga, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 67 days.

(21) Appl. No.: 11/864,576

(22) Filed: Sep. 28, 2007

(65) Prior Publication Data

US 2009/0086366 A1    Apr. 2, 2009

(51) Int. Cl.
G11B 15/18 (2006.01)
G11B 21/02 (2006.01)

(52) U.S. Cl. .......................... 360/71; 360/75
(58) Field of Classification Search .............. None
See application file for complete search history.

(56) References Cited

U.S. PATENT DOCUMENTS

| 6,751,042 | B2 * | 6/2004 | Bi et al. ............... 360/77.02 |
| 6,965,491 | B1 * | 11/2005 | Perlmutter et al. ....... 360/77.04 |
| 7,106,542 | B1 * | 9/2006 | Sun et al. .................. 360/75 |
| 7,271,977 | B1 * | 9/2007 | Melrose et al. ......... 360/77.04 |
| 2004/0257692 | A1 | 12/2004 | Ehrlich |
| 2005/0265136 | A1 | 12/2005 | Wu |
| 2006/0238912 | A1 | 10/2006 | Kumano |
| 2006/0282709 | A1 | 12/2006 | Shu |
| 2007/0189144 | A1 | 8/2007 | Masuda et al. |

* cited by examiner

*Primary Examiner*—K. Wong
(74) *Attorney, Agent, or Firm*—Schwegman Lundberg & Woessner, P.A.

(57) ABSTRACT

Methods and devices are shown that identify suitable second data operations after experiencing an off track event in a first data operation and perform the second data operations before correcting an off track event. Methods and device as shown provide increased efficiency in a hard disk drive. Time that normally would be wasted waiting for the read/write head to spin around for another try to correct an off track error is used to complete other nearby operations.

17 Claims, 7 Drawing Sheets

HARD DISK DRIVE OFF TRACK EVENT METHOD AND DEVICE

BACKGROUND

A disk drive is an information storage device. A disk drive includes one or more disks clamped to a rotating spindle and at least one head for reading information representing data from and/or writing data to the surfaces of each disk. The head is supported by a suspension coupled to an actuator that may be driven by a voice coil motor. Control electronics in the disk drive provide electrical signals to the voice coil motor to move the head to desired positions on the disks to read and write the data in tracks on the disks and to park the head in a safe area when not in use or when otherwise desired for protection of the disk drive.

Under certain circumstances, hard disk drives are subjected to more challenging operation environments such as vibration or sudden shock.

DETAILED DESCRIPTION

Hereinafter, example embodiments of the present invention will be described with reference to the drawings. In the following description, the term adjacent is defined to include locations immediately adjacent and within a nearby distance from an object being discussed.

Figure 1:
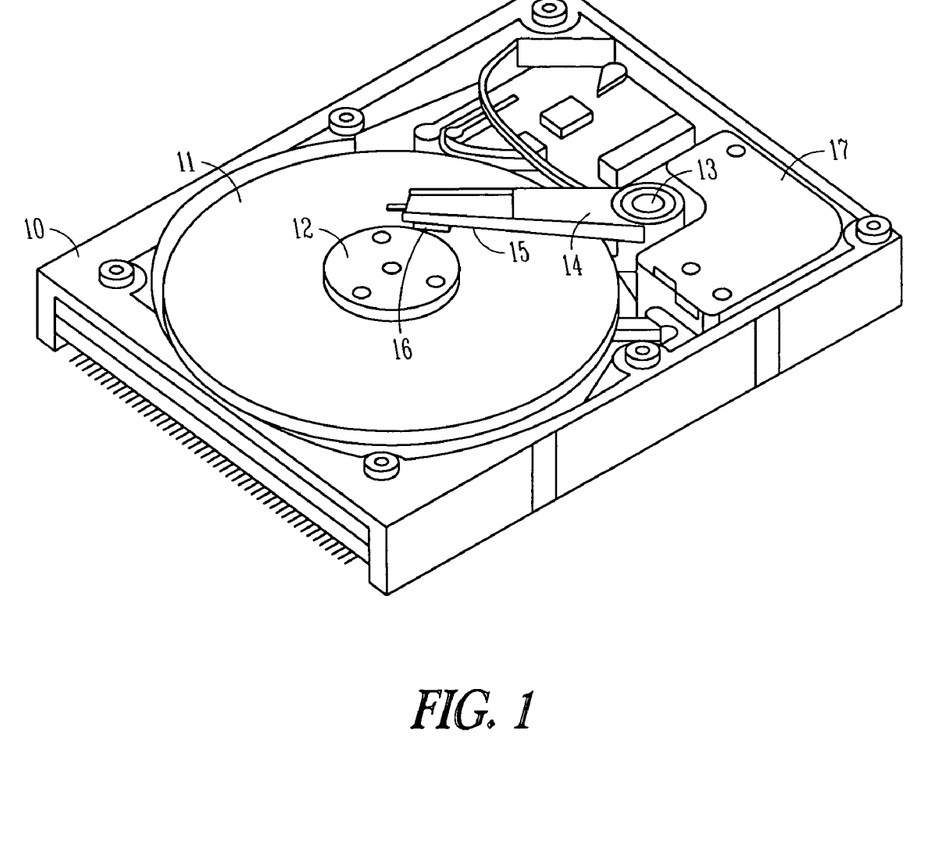
FIG. 1 is a perspective view of a magnetic recording and reproducing apparatus (hard disk drive) according to an example embodiment.

FIG. 1 is a perspective view of a magnetic recording and reproducing apparatus (hard disk drive) according to an example embodiment. The magnetic recording and reproducing apparatus comprises, inside a chassis 10, a magnetic disk 11, a head slider 16 including a read head and a write head, a head suspension assembly (a suspension 15 and an actuator arm 14) that supports the head slider 16, a voice coil motor (VCM) 17 and a circuit board.

The magnetic disk 11 is mounted on and rotated by a spindle motor 12. Various digital data are recorded on the magnetic disk 11. In an example embodiment, the magnetic head incorporated in the head slider 16 is an integrated head including a write head of a single pole structure and a read head using a shielded magneto resistive (MR) read element (such as a GMR film or a TMR film). The suspension 15 is held at one end of the actuator arm 14 to support the head slider 16 to face the recording surface of the magnetic disk 11. The actuator arm 14 is attached to a pivot 13. The voice coil motor (VCM) 17, which drives the actuator, is provided at the other end of the actuator 14. The VCM 17 drives the head suspension assembly to position the magnetic head at an arbitrary radial position of the magnetic disk 11. The circuit board comprises a head integrated circuit (IC) to generate driving signals for the VCM and control signals for controlling read and write operations performed by the magnetic head.

Figure 2:
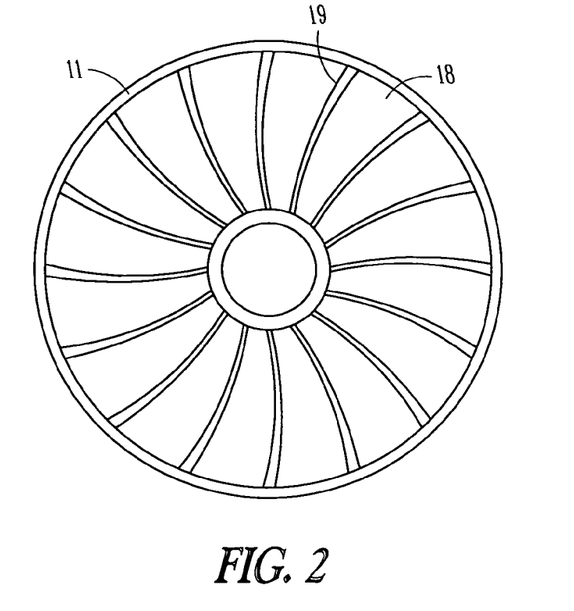
FIG. 2 is a schematic plan view of a magnetic disk according to an example embodiment.

FIG. 2 is a schematic plan view of a magnetic disk 11 according to an example embodiment. FIG. 2 shows data zones 18 and servo zones 19. User data is recorded in each of the data zones 18. This example magnetic disk has tracks formed of concentric magnetic patterns. The recording tracks will be described later by way of example with reference to FIG. 3. Servo data for head positioning is formed in each of the servo zones 19 as patterns of a differently magnetized material. In one example embodiment as shown in FIG. 2, the servo zone 19 is shaped like a circular arc corresponding to a locus of a head slider during access.

Figure 3:
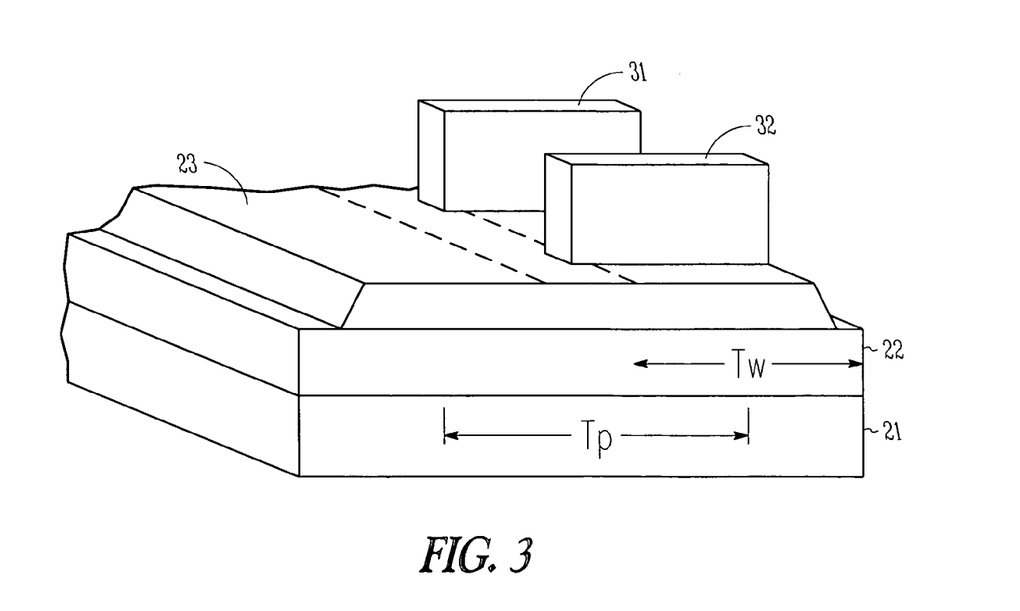
FIG. 3 is a perspective view of a portion of a magnetic disk according to an example embodiment.

FIG. 3 is a perspective view of one example of a data zone in a magnetic disk media according to an example embodiment. A soft underlayer 22 is formed on a substrate 21 with magnetic patterns constituting the recording tracks 23. The radial width and track pitch of the recording track 23 are denoted as Tw and Tp, respectively. A GMR element 31 of a read head and a single pole 32 of a write head, which are formed in the head slider, are positioned above the recording track 23.

As the substrate 21, a flat glass substrate may be used. The substrate 21 is not limited to the glass substrate but an aluminum substrate (or any other suitable substrate) may be used. A magnetic material is placed onto the substrate 21 and selectively magnetized to form recording tracks. A magnetic material such as CoCrPt may be used, although example embodiments are not so limited. Although not shown, a protective film of diamond-like carbon (DLC) may be formed on the surfaces of the media. In one example, lubricant may be applied to the surface of the protective film.

Figure 4:
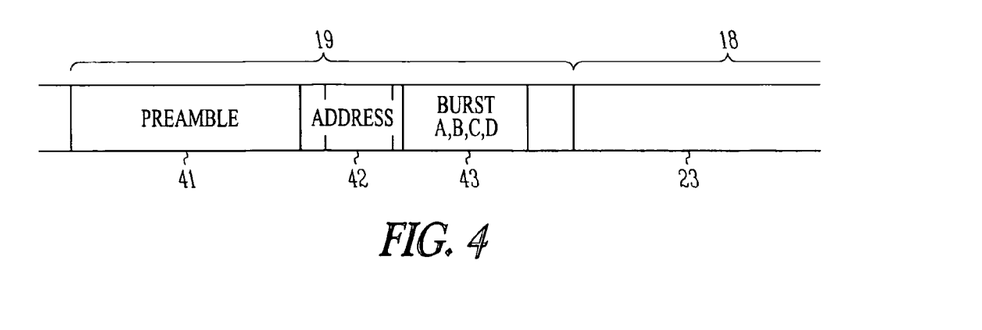
FIG. 4 is a schematic diagram showing a servo zone and a data zone in a magnetic disk according to an example embodiment.
Figure 5:
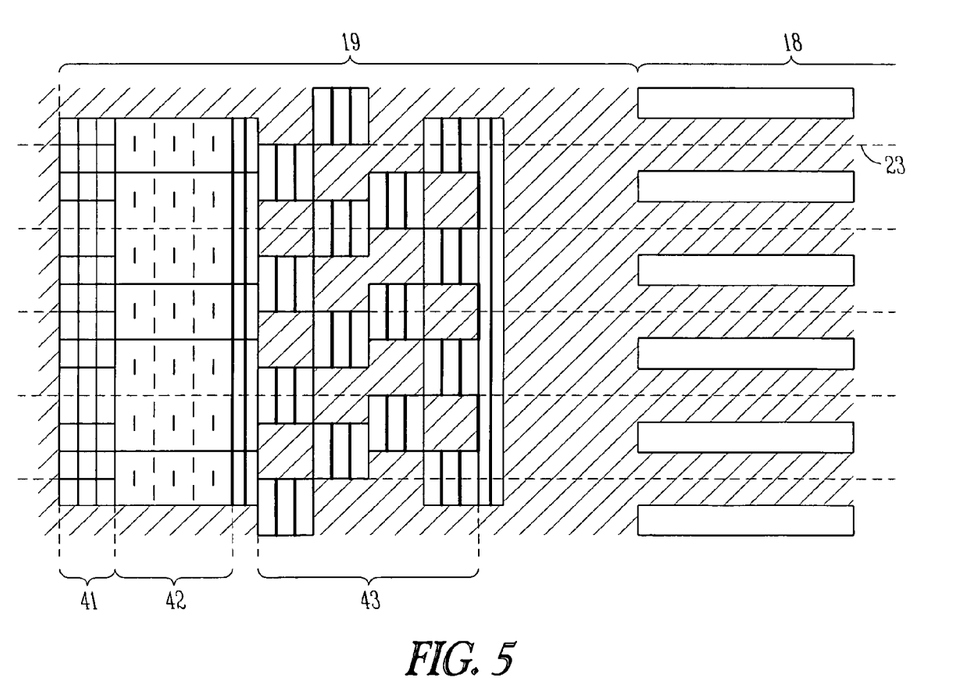
FIG. 5 is a plan view showing patterns in a servo zone and a data zone in a magnetic disk according to an example embodiment.

With reference to FIGS. 4 and 5, the patterns of the servo zone and data zone will be described. As schematically shown in FIG. 4, the servo zone 19 includes a preamble section 41, an address section 42, and a burst section 43 for detecting deviation.

As shown in FIG. 5, the data zone 18 includes the recording tracks 23. Patterns of the magnetization which provide servo signals are formed in each of the preamble section 41, address section 42, and burst section 43 in the servo zone 19. These sections may have the functions described below.

The preamble section 41 is provided to execute a phase lock loop (PLL) process for synthesizing a clock for a servo signal read relative to deviation caused by relative motions of the heads and media, and an AGC process for maintaining appropriate signal amplitude.

The address section 42 may have servo signal recognition codes called servo marks, sector data, cylinder data, and the like formed at the same pitch as that of the preamble section 41 in the circumferential direction using encoding, for example Manchester, or other types of encoding. The burst section 43 is an example of an off-track detecting region used to detect the amount of off-track with respect to the on-track state for a cylinder address. The burst section 43 includes patterns to locate a read or write head with respect to a desired track center. A pattern in FIG. 5 is shown by way of example including four fields of burst marks (A, B, C, and D), whose patterns in a radial direction are shifted relative to each other in respective fields. Other burst patterns could also be used. In one example, plural marks are arranged at the same pitch as that of the preamble section in the circumferential direction.

The principle of detection of a position on the basis of the burst section 43 will not be described in detail. When using the pattern shown, the off-track amount may be obtained by calculating the average amplitude value of read signals from the A, B, C, and D bursts. As discussed above, other patterns may be used that do not depend on average amplitude.

Figure 6:
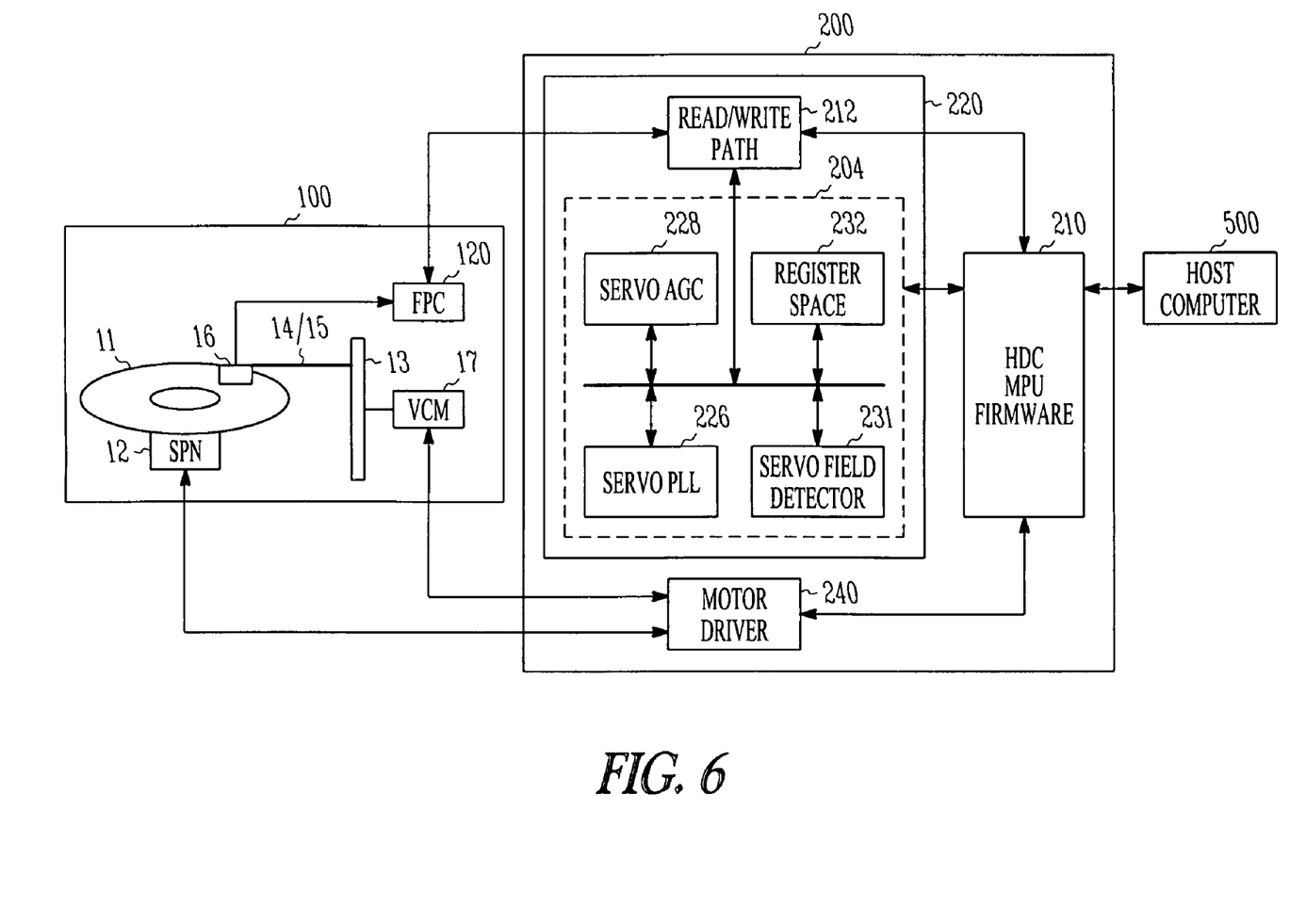
FIG. 6 is a block diagram of the magnetic recording and reproducing apparatus (hard disk drive) according to an example embodiment.

FIG. 6 shows a block diagram of the magnetic recording and reproducing apparatus (hard disk drive) according to an example embodiment. Although an example is shown, one of ordinary skill in the art, having the benefit of the present disclosure, will recognize that other device and circuit configurations are possible, and within the scope of the present invention. This Figure shows the head slider 16 only above the top surface of the magnetic disk 11. However, the magnetic recording layer is formed on each side of the magnetic disk. A down head and an up head may be provided above the bottom and top surfaces of the magnetic disk, respectively. The disk drive includes a main body unit called a head disk assembly (HDA) 100 and a printed circuit board (PCB) 200.

As shown in FIG. 6, the HDA 100 has the magnetic disk 11, the spindle motor 12, which rotates the magnetic disk 11, the head slider 16, including the read head and the write head, the suspension 15 and actuator arm 14, the VCM 17, and a head amplifier (HIC), which is not shown. The head slider 16 is provided with a read head including a read element, such as a giant magnetoresistive (GMR) element and a write head similar to elements 31 and 32 as shown in FIG. 3.

The head slider 16 may be elastically supported by a gimbal provided on the suspension 15. The suspension 15 is attached to the actuator arm 14, which is rotatably attached to the pivot 13. The VCM 17 generates a torque around the pivot 13 for the actuator arm 14 to move the head in the radial direction of the magnetic disk 11. The HIC is fixed to the actuator arm 14 to amplify input signals to and output signals from the head. The HIC is connected to the PCB 200 via a flexible cable 120. Providing the HIC on the actuator arm 14 may effectively reduce noise in the head signals. However, the HIC may be fixed to the HDA main body.

As described above, the magnetic recording layer is formed on each side of the magnetic disk 11, and the servo zones 19, each shaped like a circular arc, are formed so as to correspond to the locus of the moving head. The specifications of the magnetic disk meet outer and inner diameters and read/write characteristics adapted to a particular drive. The radius of the circular arc formed by the servo zone 19 is given as the distance from the pivot to the magnet head element.

In the illustrated example embodiment, several major electronic components, so-called system LSIs, are mounted on the PCB 200. The system LSIs are a controller 210, a read/write channel IC 220, and a motor driver IC 240. The controller 210 includes a disk controller (HDC) and an MPU, and firmware. The MPU is a control unit of a drive system and includes ROM, RAM, CPU, and a logic processing unit that implements a head positioning control system according to the present example embodiment. The logic processing unit is an arithmetic processing unit comprised of a hardware circuit to execute high-speed calculations. Firmware for the logic processing circuit is saved to the ROM or elsewhere in the disk drive. The MPU controls the drive in accordance with firmware.

The disk controller (HDC) is an interface unit in the hard disk drive which manages the whole drive by exchanging information with interfaces between the disk drive and a host computer 500 (for example, a personal computer) and with the MPU, read/write channel IC 220, and motor driver IC 240.

The read/write channel IC 220 is a head signal processing unit relating to read/write operations. The read/write channel IC 220 is shown as including a read/write path 212 and a servo demodulator 204. The read/write path 212, which can be used to read and write user data and servo data, may include front end circuitry useful for servo demodulation. The read/write path 212 may also be used for self-servowriting. It should be noted that the disk drive also includes other components, which are not shown because they are not necessary to explain the example embodiments.

The servo demodulator 204 is shown as including a servo phase locked loop (PLL) 226, a servo automatic gain control (AGC) 228, a servo field detector 231 and register space 232. The servo PLL 226, in general, is a control loop that is used to provide frequency and phase control for the one or more timing or clock circuits (not shown in FIG. 6) within the servo demodulator 204. For example, the servo PLL 226 can provide timing signals to the read/write path 212. The servo AGC 228, which includes (or drives) a variable gain amplifier, is used to keep the output of the read/write path 212 at a substantially constant level when servo zones 19 on one of the disks 11 are being read. The servo field detector 231 is used to detect and/or demodulate the various subfields of the servo zones 19, including a SAM (Servo Address Mark), a track number, a first servo burst, and a second servo burst. The MPU is used to perform various servo demodulation functions (e.g., decisions, comparisons, characterization and the like) and can be thought of as being part of the servo demodulator 204. In the alternative, the servo demodulator 204 can have its own microprocessor.

One or more registers (e.g., in register space 232) can be used to store appropriate servo AGC values (e.g., gain values, filter coefficients, filter accumulation paths, etc.) for when the read/write path 212 is reading servo data, and one or more registers can be used to store appropriate values (e.g., gain values, filter coefficients, filter accumulation paths, etc.) for when the read/write path 212 is reading user data. A control signal can be used to select the appropriate registers according to the current mode of the read/write path 212. The servo AGC value(s) that are stored can be dynamically updated. For example, the stored servo AGC value(s) for use when the read/write path 212 is reading servo data can be updated each time an additional servo zone 19 is read. In this manner, the servo AGC value(s) determined for a most recently read servo zone 19 can be the starting servo AGC value(s) when the next servo zone 19 is read.

The read/write path 212 includes the electronic circuits used in the process of writing and reading information to and from the magnetic disks 11. The MPU can perform servo control algorithms, and thus, may be referred to as a servo controller. Alternatively, a separate microprocessor or digital signal processor (not shown) can perform servo control functions.

During operation, hard disk drives such as described above may experience external mechanical disturbances. Examples of external mechanical disturbances include, but are not limited to vibrations such as from operating in a vehicle, or shock such as from bumping a hard disk drive during operation. External mechanical disturbances can sometimes cause off track events. During an off track event, the read/write head is no longer able to servo to the track it is performing a data operation on, and the data operation and the operation needs to be repeated, or otherwise corrected. While accepting the existence of off track events during drive operation, it is desirable to optimize drive operation when one or more off track events are detected.

Figure 7:
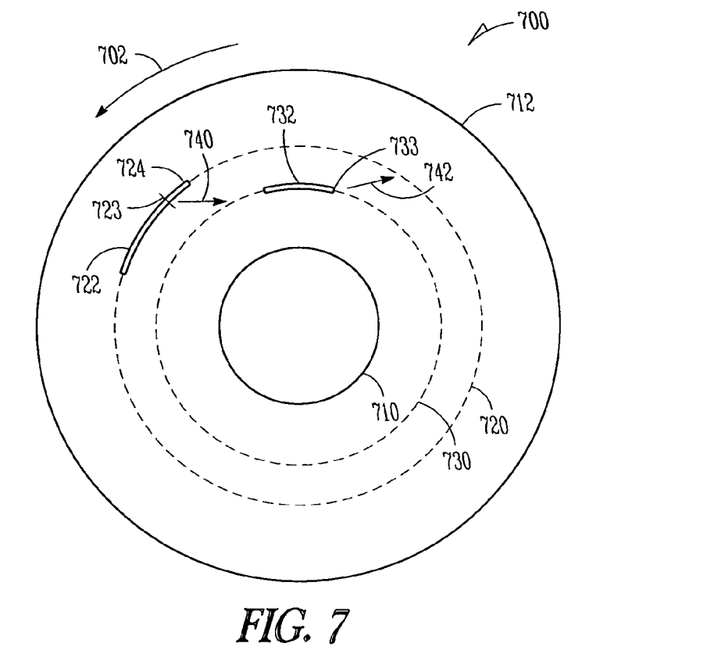
FIG. 7 is a schematic plan view of a magnetic disk in operation according to an example embodiment.

Data operations can be thought of as tracks or portions of tracks with a length, and a location. Locations can be described in polar coordinates, with a radius component, and an angular component. FIG. 7 illustrates a disk 700 having an inner diameter 710 and an outer diameter 712. During operation, the disk 700 is spinning in the direction 702 as indicated in the Figure. A first track 720 and a second track 730 are shown adjacent to each other on the disk 700 with different radial locations.

A first data operation 722 is shown on the first track 720. If the first data operation 722 were completed, the end of the operation 722 would be at end point 724. Instead, an off track event in the first data operation is illustrated at location 723. The read/write head (not shown) moves off the first track 720 in the off track event along arrow 740 and ends up over the adjacent second track 730. Common practice to correct the off track error is to wait for a full revolution of the disk and complete or re-try the operation 722.

FIG. 7 illustrates a different method that increases efficiency of the drive when subjected to external mechanical disturbances that cause off track events. After the off track event at location 723, the location 723 is recorded in order to later correct the missed portion of the operation 722 between location 723 and end point 724. A second data operation 732 that is scheduled to be completed in an adjacent second track 730 is identified based on a number of criteria. Criteria include, but are not limited to second data operation length, angular location in relation to the first data operation 722, proximity of second track 730 to the first track 720, etc.

In one example the second data operation 732 is performed before the first data operation 722 is corrected. In one example, the second data operation 732 is performed during the revolution of the hard disk immediately after the off track event from location 723. After completion of the second data operation 732 at end point 733, the read/write head returns to the first track 720 along arrow 742 to prepare to complete the first data operation 722. In one example, completing the first data operation 722 includes re-trying the operation from the first location 723 to the end point 724. In another example, completing the first data operation 722 includes re-trying the operation from a distance before the first location 723 to the end point 724. In another example, completing the first data operation 722 includes re-trying the entire operation 722.

Although only one second data operation 732 is shown in FIG. 7, in another example, a number of second data operations are completed during the revolution of the hard disk immediately after the off track event before completing the first data operation 722. Although only a single adjacent track 730 is utilized in FIG. 7, example embodiments are not so limited. In one example, a number of second data operations are completed on more than one adjacent tracks before completing the first data operation 722. In one example, the number of second data operations on multiple tracks are completed during the revolution of the hard disk between the off track event, and the next pass at the first data operation 722.

In one example a metric is included to measure how long it has been since the first data operation 722 was interrupted. If, for example, the first data operation 722 is not completed on the next revolution, it may be desirable to make completing the first data operation 722 a higher priority if it remains incomplete for too long. One metric to measure how long it has been since the first data operation 722 was interrupted includes actually counting time. Another metric includes counting revolutions of the disk. In one example embodiment, firmware such as shown in controller 210 in FIG. 6, is used to evaluate a metric and assign priority of data operations. In one example, if the first data operation 722 has been interrupted for a given length of time, the drive keeps re-trying the operation 722 until it is completed.

Figure 8:
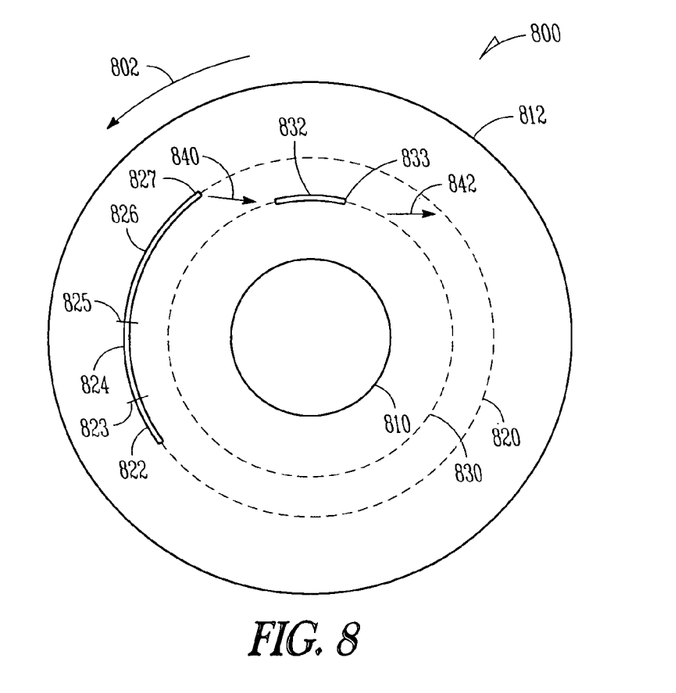
FIG. 8 is another schematic plan view of a magnetic disk in operation according to an example embodiment.

FIG. 8 illustrates another off track event and method of operation after the off track event. A disk 800 having an inner diameter 810 and an outer diameter 812. During operation, the disk 800 is spinning in the direction 802 as indicated in the Figure. A first track 820 and a second track 830 are shown adjacent to each other on the disk 800 with different radial locations.

Similar to FIG. 7, a first data operation 822 is shown on the first track 820. If the first data operation 822 were completed, the end of the operation 822 would be at end point 827. Instead, an off track event in the first data operation is illustrated at location 823. In FIG. 8, however, the read/write head loses the first track 820 at first location 823, but regains the first track 820 at second location 825, leaving an error region 824 between the first location 823 and the second location 825. The region 826 between the second location 825 and the end point 827 is good, and does not need to be corrected.

In one example, after the end point 827, at least one second data operation 832 is identified based on criteria similar to those discussed under FIG. 7. Criteria include, but are not limited to the second data operation length, angular location in relation to the first data operation 822, proximity of second track 830 to the first track 820, etc.

Once identified, the second data operation 832 is performed before correction of the error region 824 within the first data operation 822. In one example, the second data operation 832 is performed in the revolution immediately following the end point 827, and the error region 824 is corrected on the next pass of the read/write head. In other examples, multiple revolutions of the hard disk pass before correction of the error region 824. As previously discussed, although one second operation and one adjacent track are used for illustration, multiple second data operations and/or multiple adjacent tracks are utilized in selected example embodiments of the invention before the error region 824 is corrected.

After completion of the second data operation 832 at an end point 833, the read/write head returns to the first track 820 along arrow 842 to prepare to complete the error region 824. In one example, completing the error region 824 includes re-trying the region from the first location 823 to the second location 825. In another example, completing the error region 824 includes re-trying the region from a distance before the first location 823 to the second location 825.

Figure 9:
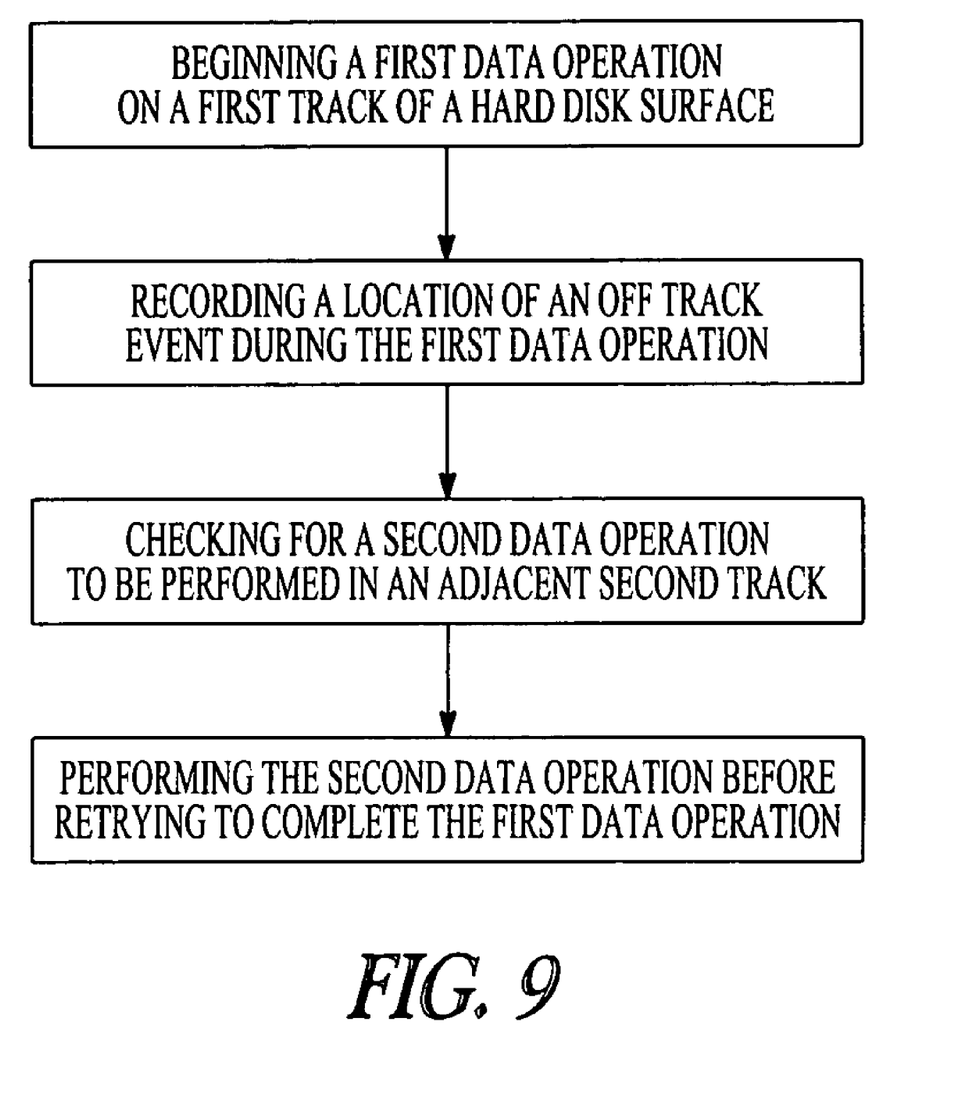
FIG. 9 is a flow diagram of a method according to an example embodiment.

FIG. 9 illustrates an example method as described in some example embodiments described herein. The method lists beginning a first data operation on a first track of a hard disk surface. When an off track event is experienced, the method also lists recording a location of an off track event during the first data operation. The method further lists checking for a second data operation to be performed in an adjacent second track, and performing the second data operation before re-trying to complete the first data operation. Although one example method is shown in FIG. 9, example embodiments are not so limited. One of ordinary skill in the art, having the benefit of the present disclosure will recognize that other variations of methods are also within the scope of the invention.

Using methods that identify suitable second data operations, and perform them before correcting an off track event provides increased efficiency in a hard disk drive. Time that normally would be wasted waiting for the read/write head to spin around for another try to correct an off track error is used to complete other nearby operations.

Figure 10:
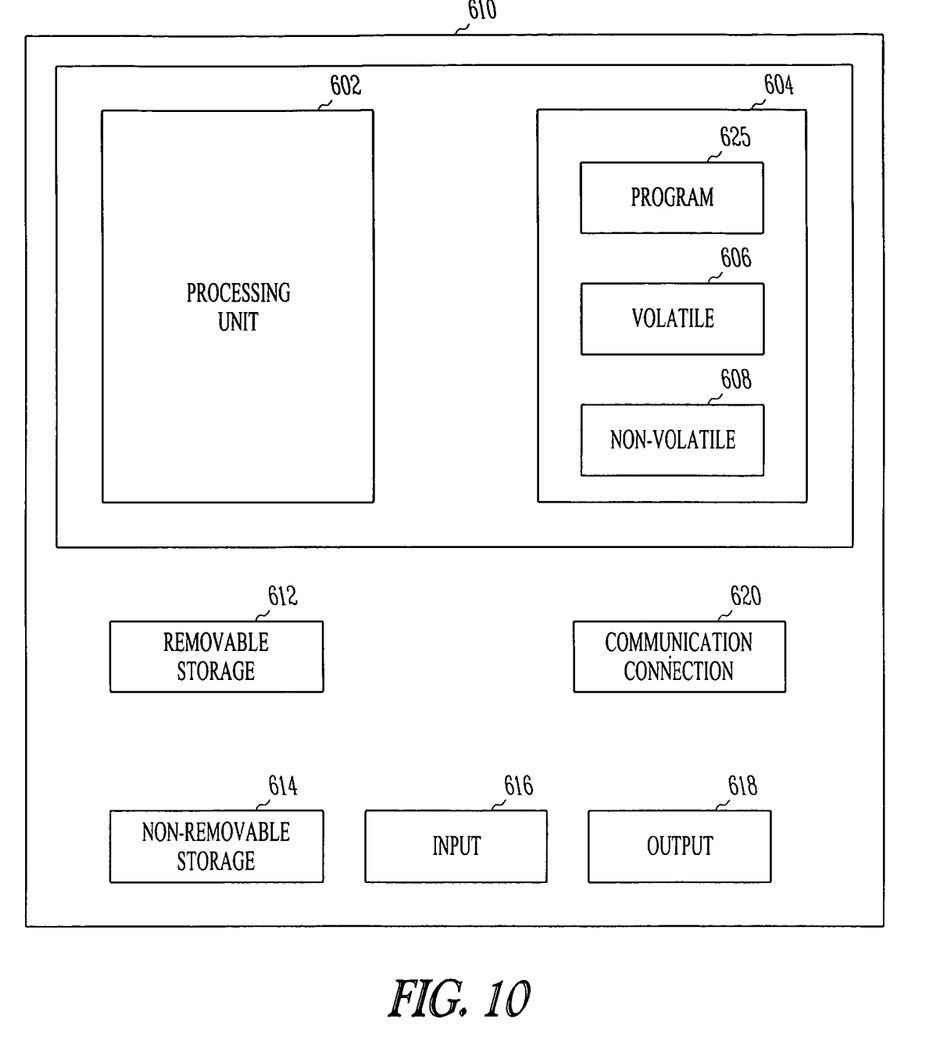
FIG. 10 is an example block diagram of a computer system for implementing methods and devices as described in accordance with example embodiments.

Software to calculate and perform the drive operations as described above is typically stored in firmware within the hard drive although example embodiments are not so limited. A block diagram of a more general computer system that executes selected methods as described is shown in FIG. 10. A general computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. The controller 210 or other selected circuitry or components of the disk drive may be such a computer system.

Computer-readable instructions stored on a computer-readable medium are executable by the processing unit 602 of the computer 610. A hard drive, CD-ROM, and RAM are some examples of articles including a computer-readable medium. As mentioned above, the computer program may also be termed firmware associated with the disk drive. In some example embodiments, a copy of the computer program 625 can also be stored on the disk 11 of the disk drive.

The foregoing description of the specific example embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed example embodiments.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method comprising:
   beginning a first data operation on a first track of a hard disk surface, the first data operation including either writing or reading user data to or from the first track;
   detecting an off track event interrupting the first data operation;
   recording a location of the off track event during the first data operation;
   checking for a second data operation to be performed in an adjacent second track, the second data operation including either writing or reading user data to or from the second track; and
   performing the second data operation during a revolution of the hard disk immediately following the off track event before re-trying to complete the interrupted first data operation.

2. The method of claim 1, wherein beginning the first data operation includes beginning a data write operation.

3. The method of claim 1, wherein beginning the first data operation includes beginning a data read operation.

4. The method of claim 1, further including completing the first data operation from the recorded location to an end of the first data operation.

5. The method of claim 1, further including completing the first data operation from a location before the recorded location to an end of the first data operation.

6. The method of claim 1, further including completing the first data operation from a location at or before the recorded location to an end of the first data operation on the next revolution of the hard disk, after completion of the second data operation.

7. The method of claim 1, further including:
   checking a metric for how long the first data operation has been incomplete; and
   assigning a priority for completion of the first data operation using the metric as a factor.

8. The method of claim 7, wherein beginning the first data operation includes beginning a data write operation.

9. The method of claim 8, wherein performing the second data operation includes performing a data write operation.

10. The method of claim 7, wherein checking the metric includes checking a time duration.

11. The method of claim 7, wherein checking the metric includes checking a number of revolutions.

12. A method comprising:
    beginning a first data operation on a first track of a hard disk surface, the first data operation including either writing or reading user data to or from the first track;
    detecting an off track event interrupting the first data operation;
    recording a first location of the off track event during the first data operation;
    recording a second location that the first data operation recovered from the off track event to define an error region between the first location and the second location;
    checking for a second data operation to be performed in an adjacent second track, the second data operation including either writing or reading user data to or from the second track; and
    performing the second data operation during a revolution of the hard disk immediately following the off track event before re-trying to complete the error region.

13. The method of claim 12, wherein checking for the second data operation to be performed in the adjacent second track includes checking a track length and location of the second data operation to select an appropriate second data operation from a number of second data operations.

14. The method of claim 12, further including completing the error region from a location at or before the first location on the next revolution of the hard disk, after completion of the second data operation.

15. The method of claim 12, further including checking a metric for how long the error region has been incomplete, and assigning a priority for completion of the error region using the metric as a factor.

16. A hard disk drive, comprising:
   a hard disk;
   a spindle motor to rotate the hard disk;
   a read/write head to follow a track on the hard disk;
   a storage medium to store computer readable instructions, the storage medium being coupled to the hard disk drive such that when the instructions are executed, the instructions cause the read/write head to perform a number of operations, including:
   beginning a first data operation on a first track of a hard disk surface, the first data operation including either writing or reading user data to or from the first track;
   detecting an off track event interrupting the first data operation;
   recording a location of the off track event during the first data operation;
   checking for a second data operation to be performed in an adjacent second track, the second data operation including either writing or reading user data to or from the second track; and
   performing the second data operation during a revolution of the hard disk immediately following the off track event before re-trying to complete the interrupted first data operation.

17. The hard disk drive of claim 16, wherein the computer readable instructions are stored in firmware within the hard disk drive.

* * * * *